US010778630B1

(12) United States Patent
Fox et al.

(10) Patent No.: US 10,778,630 B1
(45) Date of Patent: Sep. 15, 2020

(54) SIMULATION ENGAGEMENT POINTS FOR LONG RUNNING THREADS

(71) Applicant: International Business Machines Corporation, Armonk, NY (US)

(72) Inventors: Jeremy R. Fox, Georgetown, TX (US); Kelley Anders, East New Market, MD (US); Jonathan D. Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/444,626

(22) Filed: Jun. 18, 2019

(51) Int. Cl.
*G06F 15/16* (2006.01)
*H04L 12/58* (2006.01)
*G06F 16/9035* (2019.01)
*G06F 16/9032* (2019.01)
*H04L 12/18* (2006.01)

(52) U.S. Cl.
CPC .......... *H04L 51/16* (2013.01); *G06F 16/9035* (2019.01); *G06F 16/90328* (2019.01); *G06F 16/90332* (2019.01); *H04L 12/1813* (2013.01); *H04L 51/04* (2013.01)

(58) Field of Classification Search
None
See application file for complete search history.

(56) References Cited

U.S. PATENT DOCUMENTS

| 8,683,355 | B1 | 3/2014 | Gailloux |
| 9,116,984 | B2 | 8/2015 | Caldwell |
| 9,536,269 | B2* | 1/2017 | Chang .................... G06Q 50/01 |
| 9,716,677 | B2 | 7/2017 | Gandhi |
| 2014/0040274 | A1 | 2/2014 | Aravamudan |
| 2017/0331772 | A1* | 11/2017 | Stillabower ............. H04L 51/04 |
| 2018/0270325 | A1* | 9/2018 | Bonazzoli ............. H04L 67/306 |
| 2018/0367480 | A1* | 12/2018 | Housman ................. G06N 5/02 |
| 2018/0367483 | A1* | 12/2018 | Rodriguez ............ H04L 51/046 |

OTHER PUBLICATIONS

Disclosed Anonymously, "Infusing Contextual Intelligence in IM Through Analytics", IP.com Prior Art Database Technical Disclosure; IPCOM000228168D; Jun. 10, 2013, IP.com, 5 pps., <https://priorart.ip.com/IPCOM/000228168)>.

Dunne et al., "Different Every Time: A Framework to Model Real-Time Instant Message Conversations", 21st Conference of Fruct Association, 2017, IEEE, Proceeding of the 21st Conference of Fruct Association, pp. 86-99, <https://www.fruct.org/publications/fruct21/files/Dun.pdf)>.

* cited by examiner

*Primary Examiner* — Mohamed Ibrahim
(74) *Attorney, Agent, or Firm* — Donald G. Weiss (57) ABSTRACT

In an approach to determining simulation engagement points for long-running threads, one or more chat threads are monitored to create a prior chat discourse. Whether a new author has entered any chat thread is determined based on the prior chat discourse. The prior chat discourse is analyzed using topic modeling techniques to create a corpus of linguistic analysis. A social graph of participants is created in the chat thread based on the prior chat discourse. The social graph of the participants in the chat thread is analyzed using cosine similarity to create an author analysis database. The author posting frequency of the participants in the chat thread is analyzed to create a collection class of the author posting frequency. The optimal in time injection point is established. The new author is injected into the chat thread at the optimal in time injection point.

20 Claims, 7 Drawing Sheets

| PLATFORM | TOPIC | DIPs DERIVED | # USERS INJECTED | FINAL RESULT |
|---|---|---|---|---|
| SLACK | BOOTSTRAP | 1 | 2 | NEW AUTHOR INJECTED |
| StackOverflow | PYTHON | 1 | 1 | DISCUSSION COMPLETE |

FIG. 6a

| PLATFORM | TOPIC | # CHAT BOTS | # BOT TEXTS | FINAL RESULT |
|---|---|---|---|---|
| SLACK | BOOTSTRAP | 1 | 4 | BOT ENGAGED |
| StackOverflow | PYTHON | 1 | 1 | DISCUSSION COMPLETE |

SIMULATION ENGAGEMENT POINTS FOR LONG RUNNING THREADS

BACKGROUND

The present invention relates generally to the field of data processing, and more particularly to determining simulation engagement points for long-running threads.

In the current state of technology, instantaneous communications can take many forms over various technologies. One such technology is the online chat. Online chat generally refers to any kind of communication over a network that offers a real-time transmission of text messages from sender to receiver, in a one-on-one chat, or posted to a chat site in a one-to-many group chat. This is formally known as synchronous conferencing. Chat messages are generally short to enable other participants to respond quickly, thereby creating a feeling similar to a spoken conversation. This conversational interaction distinguishes chatting from other text-based online communication forms such as forums and email.

SUMMARY

Embodiments of the present invention disclose a method and a system for determining simulation engagement points for long-running threads. In one embodiment, one or more chat threads are monitored to create a prior chat discourse. Whether a new author has entered any chat thread is determined based on the prior chat discourse. The prior chat discourse is analyzed using topic modeling techniques to create a corpus of linguistic analysis. A social graph of participants in the chat thread is created based on the prior chat discourse. The social graph of the participants in the chat thread is analyzed using cosine similarity to create an author analysis database. The author posting frequency of the participants in the chat thread is analyzed to create a collection class of the author posting frequency. The optimal in time injection point is established. The new author is injected into the chat thread at the optimal in time injection point.

DETAILED DESCRIPTION

Online chat has become ubiquitous today. The ability to communicate instantaneously via chat has many advantages especially given the reality that collaborators may be located in many different geographic areas. One-to-one and one-to-many communications allow for easy collaboration over distance, and offer other advantages such as convenience of saving the chat thread for future reference, and allowing different users in different time zones to enter and leave the chat thread as needed.

A moving interaction (e.g., a long running thread) across a network of users brings complexity in terms of understanding. Not all users would have seen the thread from beginning to current state. Given the linear nature of real-time chat presentation, there needs to be a way to determine the optimal visibility of a thread at any point of its lifecycle and ascertain an optimal point in the chat discourse at which to inject a new author into the thread.

Embodiments of the present invention recognize that improvements can be made to selecting the optimal engagement point for a user entering a chat thread. Implementation of embodiments will continuously monitor ongoing chat threads to determine when a new author has entered. When a new author is detected, the prior chat discourse will be analyzed. This analysis will be used to derive a discourse injection point model, and the model will be used to inject the new author into the thread at the optimal point in the ongoing thread. If it is determined that an author is no longer available to respond to the chat thread, and a message relevant to that author is posted, a chat bot will be embodied using expert learning to continue the chat thread in the absence of the author. Once the chat conversion has ended, a summary report of the thread is generated.

Embodiments of the present invention provide role-based variability of the discourse injection point for new authors entering the chat thread by using crowdsourced data. The system will modify the injection point based upon the role and desired outcome of the new author. This would allow for new authors to be injected into different optimal points within the chat based on the role of the new author. For example, a highly technical developer would like to start at the original genesis of a technical chat to understand the finer points of the background. A support manager may only want to be injected into the chat after a resolution and direction for the problem have been determined. Both authors need to understand the issue being worked through the thread, but this allows authors to have different injection points that are relevant for their unique situation and chat discourse usage. In addition, the system can predictively inject the users based on content review and guidance by crowdsourcing feedback from other authors in the chat thread as to where and when to inject users.

As referred to herein, all data retrieved, collected, and used, is used in an opt in manner, i.e., the data provider has given permission for the data to be used. For example, the enrollment procedure for a user who wants to access the chat system could include an option that must be selected by the user before data can be collected. As another example, discourse injection program 152 could request approval from the user of the chat system before collecting the data. Any data or information used for which the provider has not opted in is data that is publicly available.

Figure 1:
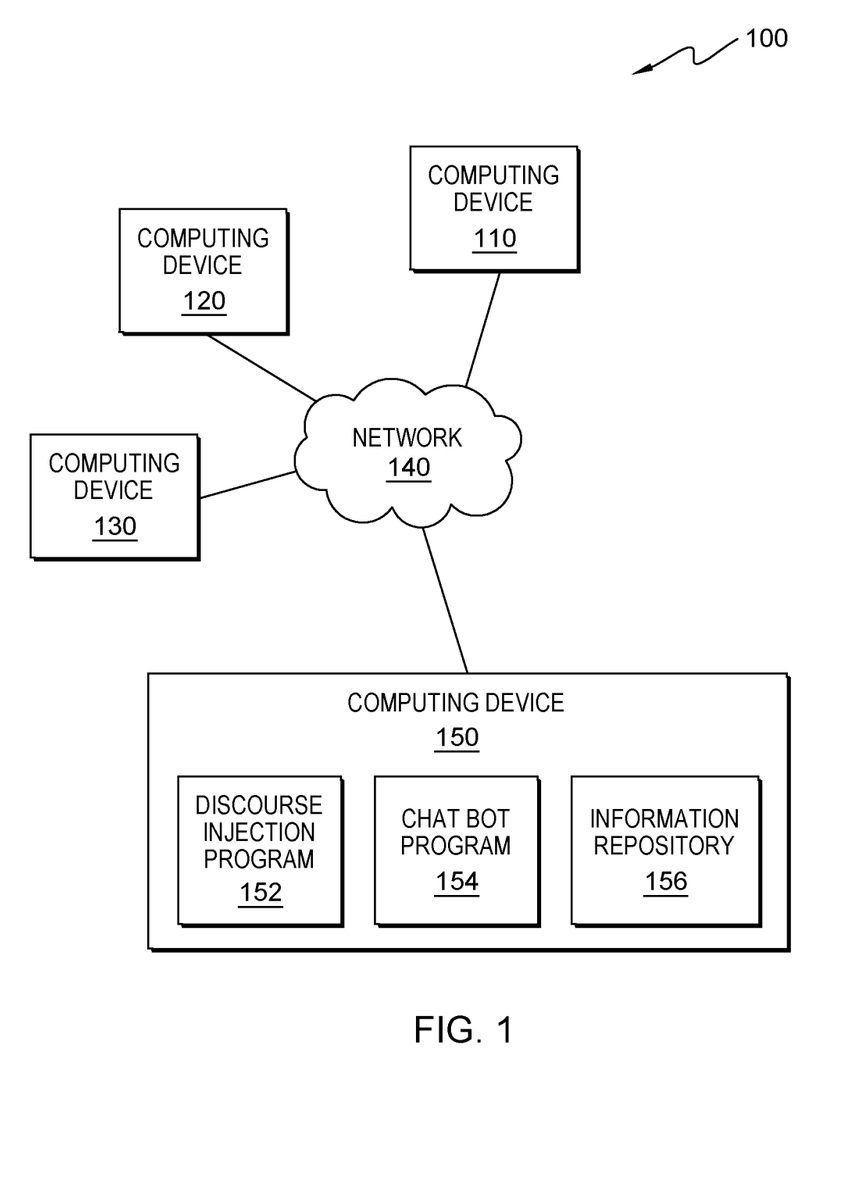
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of discourse injection program 152 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, computing device 120, computing device 130, and computing device 150, all interconnected over network 140. Network 140 can be, for example, a telecommunications network, a local area network (LAN), a wide area network (WAN), such as the Internet, or a combination of the three, and can include wired, wireless, or fiber optic connections. Network 140 can include one or more wired and/or wireless networks that are capable of receiving and transmitting data, voice, and/or video signals. In general, network 140 can be any combination of connections and protocols that will support communications between computing device 110, computing device 120, computing device 130, computing device 150, and other computing devices (not shown) within distributed data processing environment 100.

Computing device 110, computing device 120, and computing device 130 each represent one or more computing devices with which computing device 150 communicates, via network 140. Computing device 150 represents a computing device, for example a server, that gathers data from computing device 110, computing device 120, and computing device 130. Computing device 110, computing device 120, computing device 130, and computing device 150 can each be a standalone computing device, a management server, a web server, a mobile computing device, or any other electronic device or computing system capable of receiving, sending, and processing data. In other embodiments, computing device 110, computing device 120, computing device 130, and computing device 150 can represent a server computing system utilizing multiple computers as a server system, such as in a cloud computing environment. In general, computing device 110, computing device 120, computing device 130, and computing device 150 each represent any programmable electronic device or combination of programmable electronic devices capable of executing machine readable program instructions and communicating with other computing devices (not shown) within distributed data processing environment 100 via a network, such as network 140.

In an embodiment of the invention, computing device 150, computing device 130, and computing device 120 are substantially similar to computing device 110. In an embodiment, computing device 150, computing device 130, and computing device 120 may be in a similar location to computing device 110. In an alternative embodiment, computing device 110, computing device 120, computing device 130, and computing device 150 may all be in different locations. In an embodiment, distributed data processing environment 100 may include any number of computing device 110, computing device 120, computing device 130, and computing device 150.

In an embodiment, computing device 150 includes discourse injection program 152. In an embodiment, discourse injection program 152 is a program, application, or subprogram of a larger program for determining simulation engagement points for long-running threads. In an alternative embodiment, discourse injection program 152 may be located on any other device accessible by computing device 150 via network 140.

In an embodiment, computing device 150 includes chat bot program 154. In an embodiment, chat bot program 154 is a program, application, or subprogram of a larger program for determining simulation engagement points for long-running threads. In an alternative embodiment, chat bot program 154 may be located on any other device accessible by computing device 150 via network 140.

In an embodiment, computing device 150 includes information repository 156. In an embodiment, information repository 156 may be managed by discourse injection program 152. In an embodiment, information repository 156 may be managed by chat bot program 154. In an alternative embodiment, information repository 156 may be managed by the operating system of the device, alone, or together with, discourse injection program 152. In another alternative embodiment, information repository 156 may be managed by the operating system of the device, alone, or together with, chat bot program 154. In some embodiments, information repository 156 is located externally to computing device 150 and accessed through a communication network, such as network 140. In some embodiments, information repository 156 is stored on computing device 150. In some embodiments, information repository 156 may reside on another computing device (not shown), provided that information repository 156 is accessible by computing device 150. Information repository 156 includes, but is not limited to, chat data, chat history, and any other data that is received by discourse injection program 152 from one or more sources, and data that is created by discourse injection program 152. Information repository 156 may also include, but is not limited to, chat data, chat history, and any other data that is received by chat bot program 154 from one or more sources, and data that is created by chat bot program 154.

Information repository 156 may be implemented using any volatile or non-volatile storage media for storing information, as known in the art. For example, information repository 156 may be implemented with a tape library, optical library, one or more independent hard disk drives, multiple hard disk drives in a redundant array of independent disks (RAID), solid-state drives (SSD), or random-access memory (RAM). Similarly, information repository 156 may be implemented with any suitable storage architecture known in the art, such as a relational database, an object-oriented database, or one or more tables.

Figure 2:
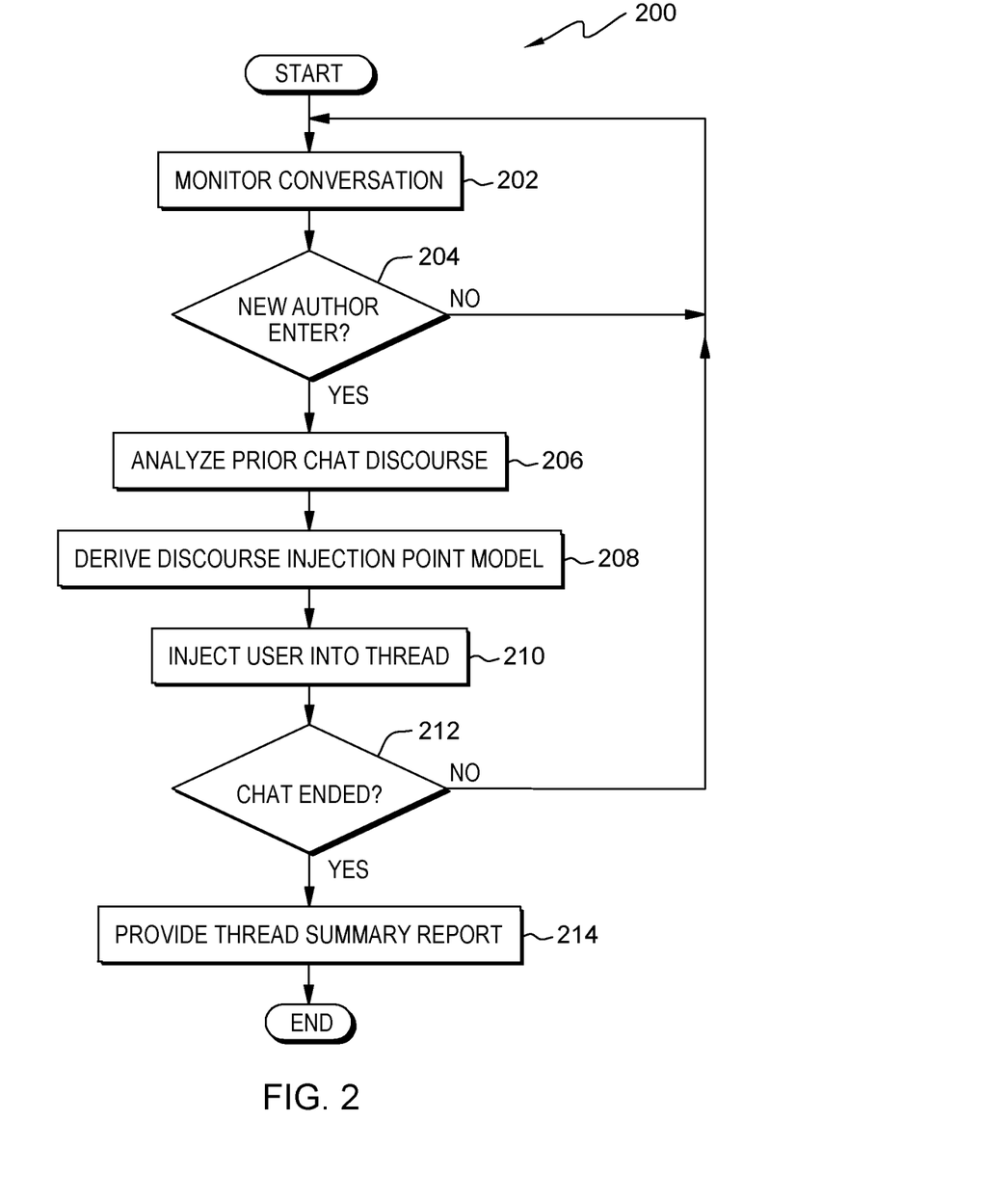
FIG. 2 is a flowchart depicting operational steps of the discourse injection program, on a computing device within the distributed data processing environment of FIG. 1, for determining simulation engagement points for long-running threads, in accordance with an embodiment of the present invention.

FIG. 2 is a flow chart diagram of workflow 200 depicting operational steps for discourse injection program 152 in accordance with at least one embodiment of the invention. In an alternative embodiment, the steps of workflow 200 may be performed by any other program while working with discourse injection program 152. It should be appreciated that embodiments of the present invention provide at least for collecting chat data and user information from computing device 110, computing device 120, and computing device 130, and determining simulation engagement points for long-running threads on computing device 150. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, discourse injection program 152 may monitor ongoing chat threads from any number of devices capable of communicating over network 140. In an embodiment, discourse injection program 152 may determine that a new author has entered the chat thread. In an embodiment, discourse injection program 152 may analyze the prior chat discourse, the posting frequency of the author, and the role of the author. In an embodiment, discourse injection program 152 may derive a discourse injection model based on the analysis. In an embodiment, discourse injection program 152 may inject the new author into the chat thread based on the discourse injection model. In an embodiment, discourse injection program 152 may determine if the chat has ended. In an embodiment, if discourse injection program 152 determines that the chat has ended, then discourse injection program 152 may provide a summary report of the thread.

Discourse injection program 152 monitors threads (step 202). At step 202, discourse injection program 152 monitors threads from one or more chat sessions on one or more sources. In an embodiment, discourse injection program 152 continuously monitors all threads on a chat host system. In another embodiment, discourse injection program 152 receives a list of threads to monitor from a user. In yet another embodiment, discourse injection program 152 starts to monitor a thread after receiving a request from a user to monitor a specific thread.

In an embodiment, the one or more sources include computing device 110, computing device 120, computing device 130, or any combination thereof. In another embodiment, the one or more sources may include any number of computing devices capable of communicating with computing device 150 over network 140. In an embodiment, discourse injection program 152 monitors chat threads and determines posting frequency and role for each author in the thread. In an embodiment, discourse injection program 152 creates a social graph of the participants in the chat thread. A social graph is a diagram that illustrates interconnections among people, groups and organizations in a social network. The social graph is a contextual sociogram, or graph drawing that plots the structure of interpersonal relations in a group situation, that describes all the members, organizations, groups and other end-user components of a social network and the relation/connection between them. A social graph helps to illustrate and map the overall structure and interrelation of social network members. Discourse injection program 152 uses the social graph in step 206.

Discourse injection program 152 determines if a new author enters (step 204). At step 204, discourse injection program 152 determines if a new author enters an ongoing chat thread. In an embodiment, discourse injection program 152 determines that an author is new if that author has not posted any messages in the ongoing chat thread. In another embodiment, discourse injection program 152 determines that an author is new if that author previously participated in the current thread, but the length of time since that author last posted exceeds a default threshold. If discourse injection program 152 determines that a new author has entered (decision step 204, YES branch), then discourse injection program 152 proceeds to step 206. If discourse injection program 152 determines that a new author has not entered (decision step 204, NO branch), then discourse injection program 152 returns to step 202.

Discourse injection program 152 analyzes prior chat discourse (step 206). If discourse injection program 152 determines that a new author has entered (decision step 204, YES branch), then discourse injection program 152 analyzes the prior chat discourse, the posting frequency of the participants, and the roles of the participants. In an embodiment, discourse injection program 152 analyzes the author posting frequency of the participants in the chat thread to create a collection class of the author posting frequency containing the derived results of the posting frequency of the participants in the chat thread. In an embodiment, discourse injection program 152 uses linguistic analysis, including topic modeling techniques, to analyze the interaction and visibility of the chat participants by topic. In an embodiment, discourse injection program 152 uses the results of the analysis to create a corpus of linguistic analysis. In an embodiment, discourse injection program 152 uses the Latent Dirichlet Allocation (LDA) model to analyze the interaction and visibility of the chat participants by topic. LDA is a generative probabilistic model of a corpus. LDA is used to uncover the hidden topics from a text corpus. In general, documents are modeled as mixtures of topics, where a topic is a probability distribution over words. Statistical techniques are then utilized to learn the topic components and mixture coefficients of each document. In an embodiment, discourse injection program 152 uses this model to determine the context of the thread.

In an embodiment, discourse injection program 152 uses the BiTerm Model (BTM) to analyze the interaction and visibility of the chat participants by topic. BTM is a modeling technique that learns topics over short texts by directly modeling the generation of biterms in the whole corpus, where a biterm is an unordered word-pair co-occurred in a short context. The data generation process under BTM is that the corpus consists of a mixture of topics, and each biterm is drawn from a specific topic. In an embodiment, discourse injection program 152 uses this model to build a corpus of the linguistic analysis.

In an embodiment, discourse injection program 152 uses the social graph from step 202 and calculates cosine similarity to measure the relative position of the author within the social graph and creates an author analysis database of the results. Cosine similarity is a metric used to determine how similar two objects are irrespective of their size. Cosine similarity measures the cosine of the angle between two vectors projected in a multi-dimensional space. The smaller the cosine of the angle between the vectors, the more similar they are. In an embodiment, discourse injection program 152 creates vectors from the social graph data and calculates the cosine similarity between the vectors to determine the position of the author within the social graph of step 202. In an embodiment, discourse injection program 152 calculates a set of similarity scores between the participants based on the cosine similarity. In an embodiment, discourse injection program 152 analyzes the organizational structures between the chat participants to ascertain their social or organizational relationships. For example, from the analysis, discourse injection program 152 determines that the author is working with someone who is in the direct management chain or a neighboring management chain of the author.

Figure 4:
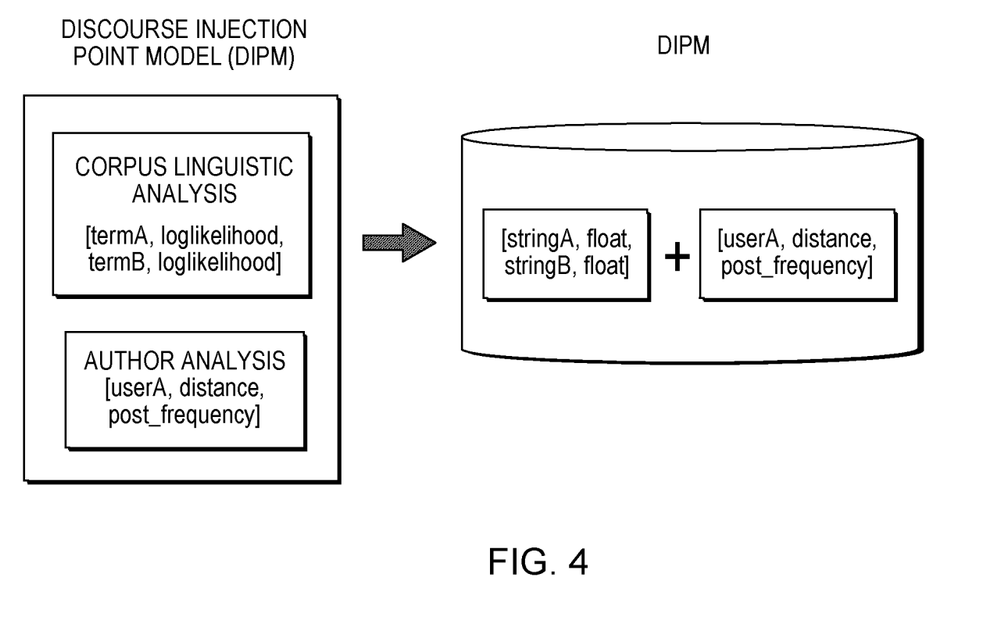
FIG. 4 depicts a block diagram of components of the discourse injection point model used by the discourse injection program within the distributed data processing environment of FIG. 1, in accordance with an embodiment of the present invention.

Discourse injection program 152 derives the discourse injection point model (step 208). At step 208, discourse injection program 152 derives the discourse injection point (DIP) model based on the results of the analysis in step 206. In an embodiment, discourse injection program 152 uses the corpus of linguistic analysis and combines it with the author analysis database to create the discourse injection point model. FIG. 4 is an example of one possible embodiment of the discourse injection point model (DIP model). In an embodiment, discourse injection program 152 creates the DIP model as a container that holds the results of the topic modelling analysis, i.e., the terms found in the chat thread and the log-likelihood of those terms. In an embodiment, discourse injection program 152 adds the similarity scores between a group of users calculated in step 206 to the DIP model. In an embodiment, discourse injection program 152 uses the posting frequency of the participants to create a collection class of the posting frequency results. In an embodiment, discourse injection program 152 uses the DIP model to determine the intersection of the individual analyses. In an embodiment, discourse injection program 152 uses the intersection of the individual analyses to determine the optimal in time injection point for the new author. In an embodiment, discourse injection program 152 determines the optimal in time injection point based on the confluence of the corpus of linguistic analysis, the author analysis database, and the collection class of the author posting frequency.

Discourse injection program 152 injects the new author into the thread (step 210). At step 204, discourse injection program 152 injects the new author into the chat thread at the optimal in time injection point determined in step 208. Discourse injection program 152 uses the DIP model to inject the new author into the thread at the required temporal chat location. In an embodiment, discourse injection program 152 uses the DIP model to provide a visual overlay based on the topic analysis and author post frequency distance. The visual overlay triangulates where the new author should be injected into a chat thread either as a direct reply to a post or continuance of a thread. In an embodiment, multiple new authors may enter a chat thread. Discourse injection program 152 injects the multiple new authors into the chat thread, where each new author is injected at a different injection point.

Discourse injection program 152 determines if the chat has ended (step 212). At step 212, discourse injection program 152 determines if the chat thread has ended. In an embodiment, discourse injection program 152 compares the length of time since the last message was posted to a threshold assigned by a user. If the length of time since the last message was posted exceeds the threshold, discourse injection program 152 determines that the chat thread has ended. In another embodiment, discourse injection program 152 may determine that all chat participants have logged out of the system, and therefore determines that the chat thread has ended. In yet another embodiment, discourse injection program 152 may determine that the chat moderator has closed the chat thread, and therefore determines that the chat thread has ended.

If discourse injection program 152 determines that the chat has ended (decision step 212, YES branch), then discourse injection program 152 proceeds to step 214. If discourse injection program 152 determines that the chat has not ended (decision step 212, NO branch), then discourse injection program 152 returns to step 202.

Figure 6A:
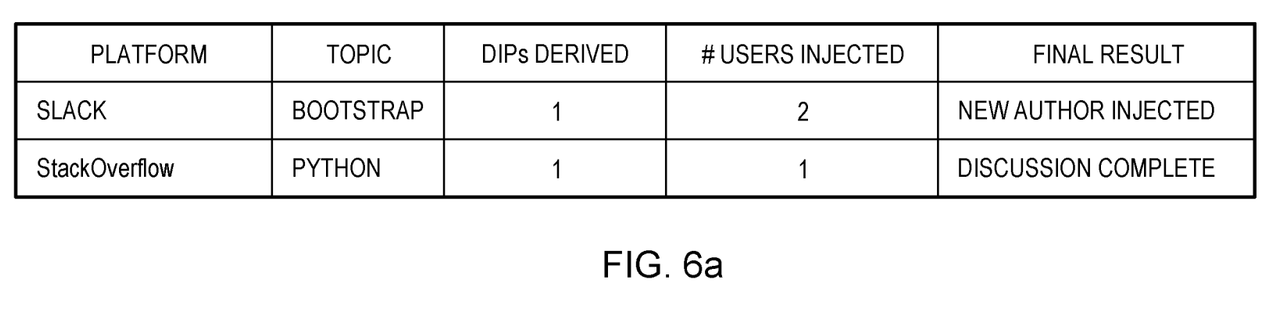
FIG. 6*a* is a table depicting a sample summary report for the discourse injection program, in accordance with an embodiment of the present invention.

Discourse injection program 152 provides a summary report (step 214). At step 214, discourse injection program 152 records the history of transactions between the model and chat platform and provides a summary report. In an embodiment, the summary report may display the platform on which the chat thread took place; the topic of the chat thread; the DIPs derived for new authors; the number of new authors injected into the chat thread; and the final results, as shown in FIG. 6*a*. In another embodiment, the summary report may be formatted to show any data in any order that a user might require. In an embodiment, discourse injection program 152 may provide the summary report to a user when the chat thread ends. In another embodiment, discourse injection program 152 may provide the summary report to a user upon request by the user.

Figure 3:
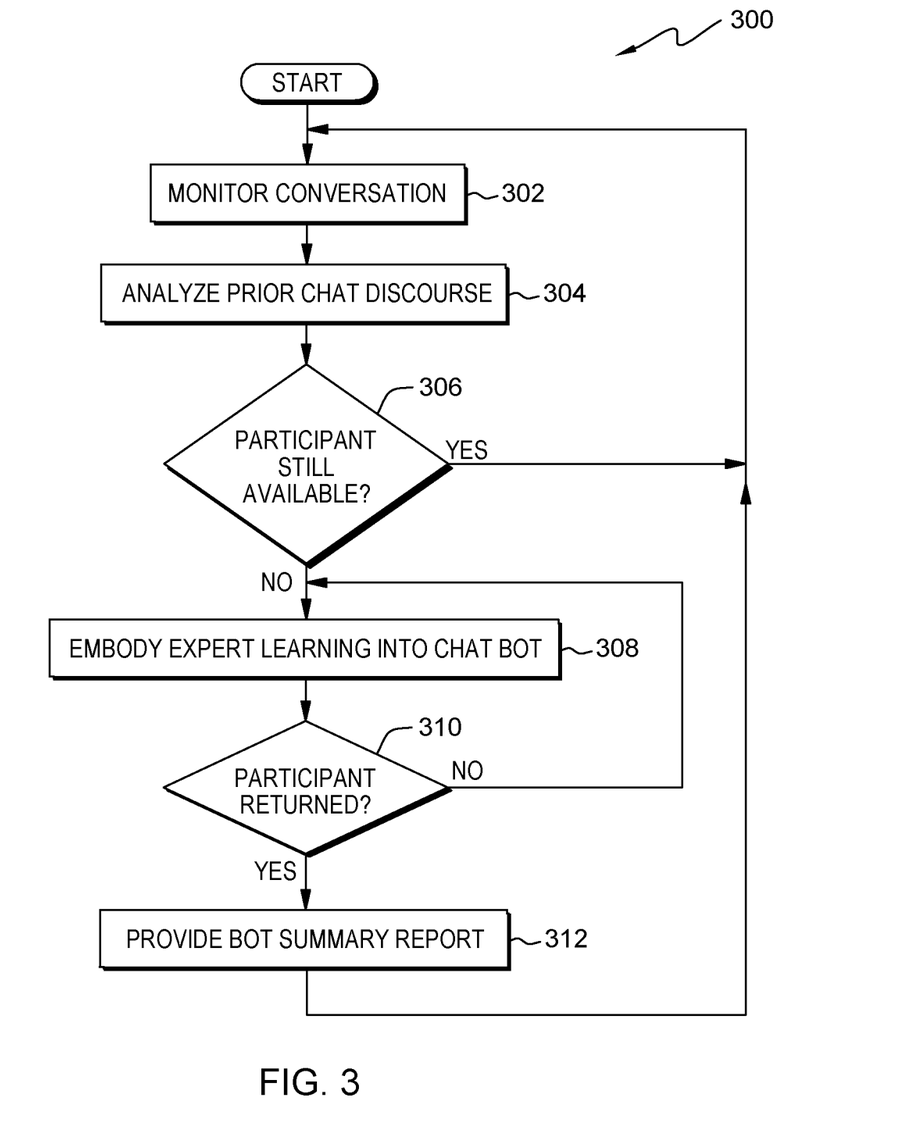
FIG. 3 is a flowchart depicting operational steps of the chat bot program, on a computing device within the distributed data processing environment of FIG. 1, for embodying an expert system into a chat bot, in accordance with an embodiment of the present invention.

FIG. 3 is a flow chart diagram of workflow 300 depicting operational steps for chat bot program 154 in accordance with at least one embodiment of the invention. In an alternative embodiment, the steps of workflow 300 may be performed by any other program while working with chat bot program 154. It should be appreciated that embodiments of the present invention provide at least for collecting chat data and user information from computing device 110, computing device 120, and computing device 130, and embodying expert learning into a chat bot on computing device 150. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In an embodiment, chat bot program 154 monitors ongoing chat threads from any number of devices capable of communicating over network 140. In an embodiment, chat bot program 154 analyzes the prior chat discourse, the posting frequency of the author, and the role of the author. In an embodiment, chat bot program 154 determines if a chat participant is still available when a relevant message is posted. In an embodiment, if the chat participant is not still available when a relevant message is posted, chat bot program 154 embodies expert learning into a chat bot to propagate the thread. In an embodiment, chat bot program 154 determines if the chat participant has returned to the chat thread. In an embodiment, if chat bot program 154 determines that the chat participant has returned to the chat thread, then chat bot program 154 may provide a summary report of the chat thread to the chat participant.

Chat bot program 154 monitors threads (step 302). At step 302, chat bot program 154 monitors threads from one or more chat sessions on one or more sources. In an embodiment, chat bot program 154 monitors all threads on a chat host system. In another embodiment, chat bot program 154 receives a list of threads to monitor from a user. In yet another embodiment, chat bot program 154 starts to monitor a thread after receiving a request from a user to monitor a specific thread.

In an embodiment, the one or more sources include computing device 110, computing device 120, computing device 130, or any combination thereof. In another embodiment, the one or more sources may include any number of computing devices capable of communicating with computing device 150 over network 140. In an embodiment, chat bot program 154 monitors chat threads and determines posting frequency and role for each author in the thread. In an embodiment, chat bot program 154 creates a social graph of the participants in the chat thread. A social graph is a diagram that illustrates interconnections among people, groups and organizations in a social network. The social graph is a contextual sociogram, or graph drawing that plots the structure of interpersonal relations in a group situation, that describes all the members, organizations, groups and other end-user components of a social network and the relation/connection between them. A social graph helps to illustrate and map the overall structure and interrelation of social network members. Chat bot program 154 uses the social graph in step 304.

Chat bot program 154 analyzes prior chat discourse (step 304). At step 304, chat bot program 154 analyzes the prior chat discourse, the posting frequency of the participants, and the roles of the participants. In an embodiment, chat bot program 154 uses linguistic analysis, including topic modeling techniques, to analyze the interaction and visibility of the chat participants by topic. In an embodiment, chat bot program 154 creates a corpus of the results of the linguistic analysis. In an embodiment, chat bot program 154 uses the Latent Dirichlet Allocation (LDA) model to analyze the interaction and visibility of the chat participants by topic. LDA is a generative probabilistic model of a corpus. LDA is used to uncover the hidden topics from a text corpus. In general, documents are modeled as mixtures of topics, where a topic is a probability distribution over words. Statistical techniques are then utilized to learn the topic components and mixture coefficients of each document. In an embodiment, chat bot program 154 uses this model to determine the context of the thread.

In an embodiment, chat bot program 154 uses the BiTerm Model (BTM) to analyze the interaction and visibility of the chat participants by topic. BTM is a modeling technique that learns topics over short texts by directly modeling the generation of biterms in the whole corpus, where a biterm is an unordered word-pair co-occurred in a short context. The data generation process under BTM is that the corpus consists of a mixture of topics, and each biterm is drawn from a specific topic. In an embodiment, chat bot program 154 uses this model to build a corpus of the linguistic analysis.

In an embodiment, chat bot program 154 uses the social graph from step 302 and calculates cosine similarity to measure the relative position of the author within the social graph and creates an author analysis database of the results. Cosine similarity is a metric used to determine how similar two objects are irrespective of their size. Cosine similarity measures the cosine of the angle between two vectors projected in a multi-dimensional space. The smaller the cosine of the angle between the vectors, the more similar they are. In an embodiment, chat bot program 154 creates vectors from the social graph data and calculates the cosine similarity between the two vectors to determine the position of the author within the social graph of step 302. In an embodiment, chat bot program 154 analyzes the organizational structures between the chat participants to ascertain their social or organizational relationships. For example, from the analysis, chat bot program 154 determines that the author is working with someone who is in the direct management chain or a neighboring management chain of the author.

Chat bot program 154 determines if a specific participant is still available (step 306). At step 306, if chat bot program 154 detects that a message is posted in the chat thread, the topic of which should be of interest to a specific participant, chat bot program 154 determines if the specific participant is still available in the ongoing chat thread. In an embodiment, when a new message is posted that is relevant to a specific participant, chat bot program 154 waits a predetermined length of time assigned by a user. If the specific participant does not respond to the new message during the length of time assigned by the user, chat bot program 154 determines that the specific participant is not still available. In another embodiment, chat bot program 154 checks if the specific participant is still logged into the chat system. If the specific participant is not still logged into the chat system, chat bot program 154 determines that the specific participant is no longer available. In yet another embodiment, chat bot program 154 receives a notification from the specific participant that the specific participant is no longer available.

If chat bot program 154 determines that the specific participant is still available (decision step 306, YES branch), then chat bot program 154 returns to step 302. If chat bot program 154 determines that the specific participant is not still available (decision step 306, NO branch), then chat bot program 154 proceeds to step 308.

Chat bot program 154 embodies expert learning into a chat bot (step 308). If chat bot program 154 determines that the specific participant is not still available (decision step 306, NO branch), then chat bot program 154 embodies expert learning into a chat bot to propagate the chat thread. In an embodiment, if the specific participant is not available, chat bot program 154 embodies the expert learning from step 304 into a chat bot to propagate scaffolding chat. In this context, scaffolding refers to training a chat bot to be able to continue the thread, i.e., create chat messages based on the expert information from the analysis in step 304 to stimulate continuation of the chat thread. Chat bot program 154 will use scaffolding to continue the chat thread by posting messages to the chat thread until the specific participant returns or until chat bot program 154 is instructed to discontinue the chat bot by a user or administrator of the chat session.

Chat bot program 154 determines if the specific participant has returned (step 310). At step 310, if chat bot program 154 detects that a message is posted in the chat thread, the topic of which should be of interest to the specific participant, chat bot program 154 determines if the specific participant has returned to the ongoing chat thread. In an embodiment, chat bot program 154 uses a threshold length of time set up by a user to determine if the specific participant has returned to the chat thread. When a new message is posted that is relevant to a specific participant, chat bot program 154 determines if the length of time since the message was posted without a response from the specific participant exceeds the threshold. If the length of time since the message was posted exceeds the threshold, chat bot program 154 determines that the specific participant has not returned to the chat thread. In another embodiment, chat bot program 154 checks if the specific participant has logged back into the system. If the specific participant has not logged into the system, chat bot program 154 determines that the specific participant has not returned to the chat thread. In yet another embodiment, chat bot program 154 receives a notification from the specific participant that the specific participant has returned to the chat thread.

If chat bot program 154 determines that the specific participant has returned (decision step 310, YES branch), then chat bot program 154 proceeds to step 312. If chat bot program 154 determines that the specific participant has not returned (decision step 310, NO branch), then chat bot program 154 returns to step 308.

Figure 6B:
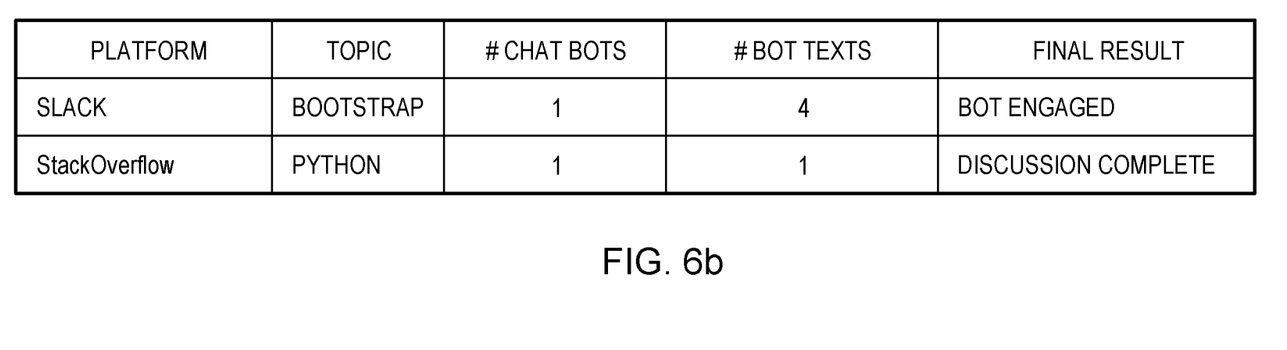
FIG. 6*b* is a table depicting a sample summary report for the chat bot program, in accordance with an embodiment of the present invention.

Chat bot program 154 provides a summary report (step 312). At step 312, if the specific participant has returned, then chat bot program 154 records the history of transactions between the chat bot and the chat platform and provides a summary report. In an embodiment, the summary report may display the platform on which the chat thread took place; the topic of the chat thread; the number of chat bots embodied into the chat thread; the number of texts posted by the chat bots; and the final results, as shown in FIG. 6b. In another embodiment, the summary report may be formatted to show any data in any order that a user might require. In an embodiment, chat bot program 154 provides the summary report to the specific participant when the specific participant returns to the chat thread. In another embodiment, chat bot program 154 provides the summary report to a user upon request by the user.

Figure 5:
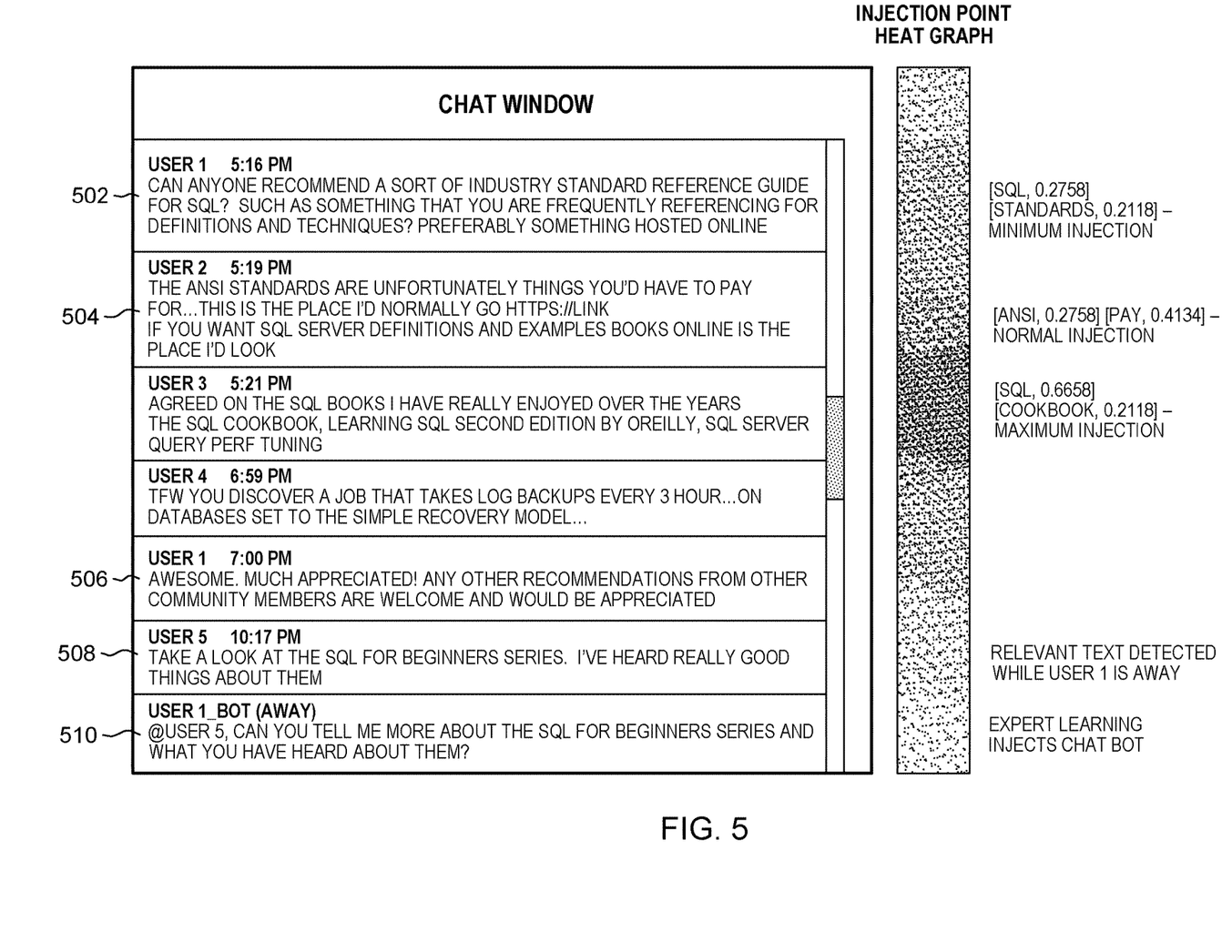
FIG. 5 is a sample chat window use case for the discourse injection program, in accordance with an embodiment of the present invention.

FIG. 5 depicts one possible example of a chat thread on computing device 150. In this example, message 502 and message 506 represent the range of the relevant topic in the current chat thread. Message 502 represents the minimum discourse injection point, as determined by discourse injection program 152 in step 210. Message 506 represents the maximum discourse injection point, as determined by discourse injection program 152 in step 210. Message 504 represents the normal discourse injection point, as determined by discourse injection program 152 in step 210.

In an embodiment, discourse injection program 152 displays the injection point on the chat screen of the new author as a thermograph visual representation. In an embodiment, discourse injection program 152 displays the thermograph as a color image, where, for example, the optimal injection point in the thread is colored red, the range of injection points within the same topic as the optimal injection point is colored orange, and all the points outside the same topic as the optimal injection point are colored green. In another embodiment, discourse injection program 152 displays the thermograph as a black and white image, using different stippling effects to represent the different colors. FIG. 5 includes an example of how discourse injection program 152 may display a thermograph on the chat screen, using the different stippling effects in black and white. In yet another embodiment, discourse injection program 152 may display the thermograph as a gray scale image, using different densities of gray to represent the different colors.

In an embodiment, chat bot program 154 may display the expert learning chat bot message that is posted while the author is not available as also illustrated in FIG. 5. Message 510 represents the chat bot embodied by chat bot program 154 based on the expert learning from step 306.

Figure 7:
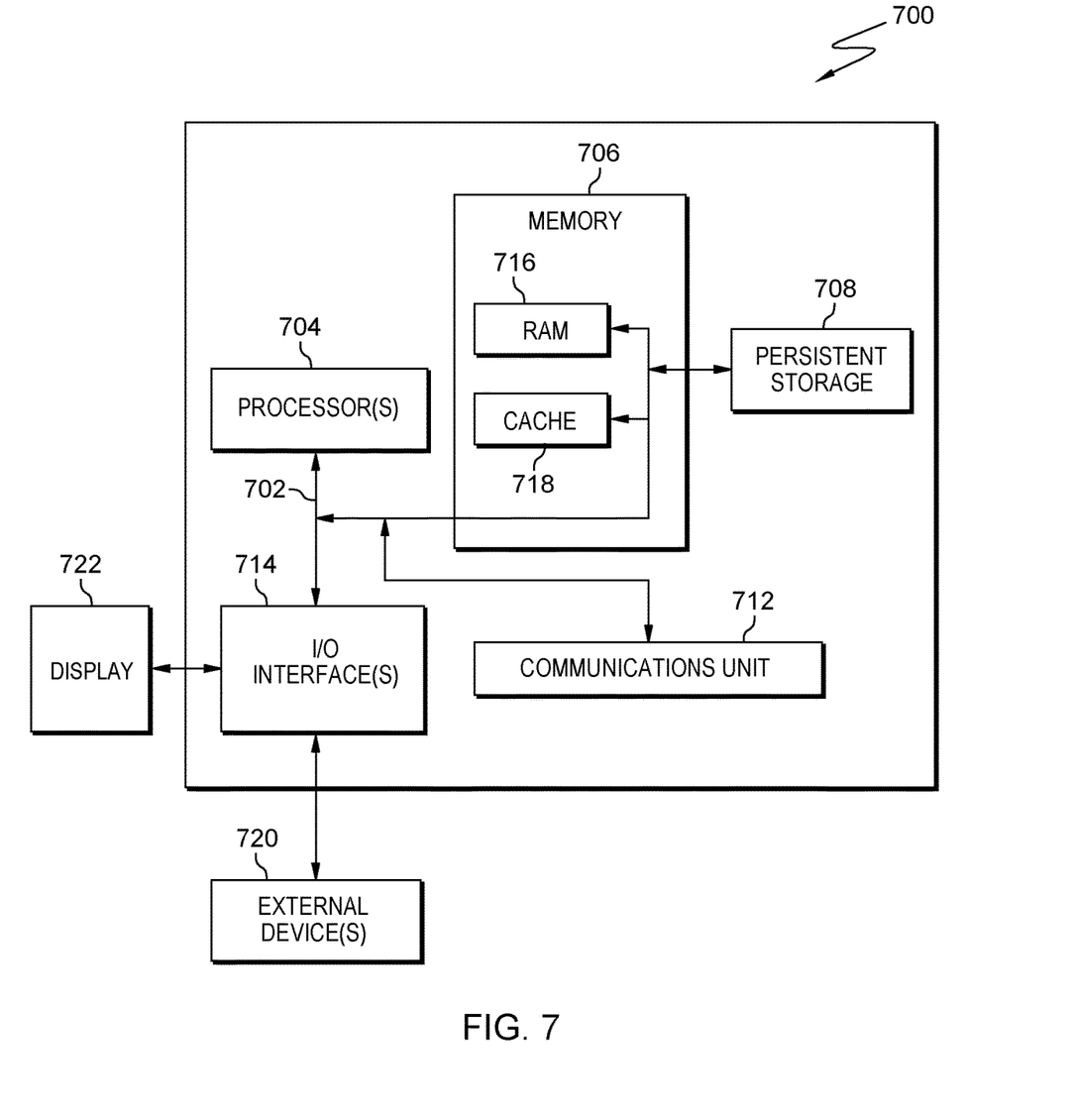
FIG. 7 depicts a block diagram of components of the computing devices executing the discourse injection program within the distributed data processing environment of FIG. 1, in accordance with an embodiment of the present invention.

FIG. 7 depicts a block diagram of components of computing device 150 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computing device 110, computing device 120, computing device 130, and computing device 150 can each include processor(s) 704, cache 718, memory 706, persistent storage 708, communications unit 712, input/output (I/O) interface (s) 714 and communications fabric 702. Communications fabric 702 provides communications between cache 718, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM). In general, memory 706 can include any suitable volatile or non-volatile computer readable storage media. Cache 718 is a fast memory that enhances the performance of processor(s) 704 by holding recently accessed data, and data near recently accessed data, from memory 706.

Program instructions and data used to practice embodiments of the present invention, e.g., discourse injection program 152, chat bot program 154, data from computing devices 110 and 120, and data from imaging devices 130 and 140, are stored in persistent storage 708 of computing device 150 for execution and/or access by one or more of the respective processor(s) 704 of computing device 150 via memory 706. In one embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. Discourse injection program 152, chat bot program 154, data from computing devices 110 and 120, and data from imaging devices 130 and 140 may be downloaded to persistent storage 708 of computing device 150 through communications unit 712.

I/O interface(s) 714 allows for input and output of data with other devices that may be connected to computing device 150. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., discourse injection program 152 and chat bot program 154, can be stored on such portable computer readable storage media and can be loaded onto persistent storage 708 via I/O interface(s) 714. I/O interface(s) 714 also connect to a display 722. Software and data used to practice embodiments of the present invention, e.g., discourse injection program 152 and chat bot program 154, can be stored on such portable computer readable storage media and can be loaded onto persistent storage 708 via I/O interface(s) 714.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for determining simulation engagement points for chat threads, the computer-implemented method comprising the steps of:
    monitoring, by one or more computer processors, one or more chat threads to create a prior chat discourse, wherein the prior chat discourse contains one or more chat data, an author posting frequency of the participants in the chat thread of the one or more chat threads, and an author role of the participants in the chat thread of the one or more chat threads;
    determining, by one or more computer processors, whether a new author has entered any chat thread of the one or more chat threads based on the prior chat discourse;
    responsive to determining that the new author has entered any chat thread of the one or more chat threads, analyzing, by one or more computer processors, the prior chat discourse using topic modeling techniques to create a corpus of linguistic analysis, wherein the corpus of linguistic analysis includes one or more terms of the chat thread of the one or more chat threads and a log-likelihood of the terms of the chat thread of the one or more chat threads;
    creating, by one or more computer processors, a social graph of participants in the chat thread of the one or more chat threads based on the prior chat discourse;
    analyzing, by one or more computer processors, the social graph of the participants in the chat thread of the one or more chat threads using cosine similarity to create an author analysis database, wherein the author analysis database contains a similarity scores between the participants in the chat thread of the one or more chat threads;
    analyzing, by one or more computer processors, the author posting frequency of the participants in the chat thread of the one or more chat threads to create a collection class of the author posting frequency of the participants in the chat thread, wherein the collection class of the author posting frequency contains a derived results of the posting frequency of the participants in the chat thread of the one or more chat threads;
    combining, by one or more computer processors, the corpus of linguistic analysis and the author analysis database to create a discourse injection point model of participants in the chat thread of the one or more chat threads;
    establishing, by one or more computer processors, an optimal in time injection point, wherein the optimal in time injection point is determined from a confluence of the corpus of linguistic analysis, the author analysis database, and the collection class of the author posting frequency; and
    injecting, by one or more computer processors, the new author into the any chat thread of the one or more chat threads at the optimal in time injection point.

2. The computer-implemented method of claim 1, wherein injecting the new author into the any chat thread of the one or more chat threads at the optimal in time injection point further comprises using, by one or more computer processors, the discourse injection point model to provide a visual overlay.

3. The computer-implemented method of claim 2, wherein providing the visual overlay further comprises displaying, by one or more computer processors, the visual overlay as a thermograph visual representation.

4. The computer-implemented method of claim 1, wherein the topic modeling techniques to create the corpus of linguistic analysis further comprises using, by one or more computer processors, a Latent Dirichlet Allocation model to analyze an interaction and visibility of the participants in the chat thread of the one or more chat threads by topic.

5. The computer-implemented method of claim 1, wherein the topic modeling techniques to create the corpus of linguistic analysis further comprises using, by one or more computer processors, a BiTerm Model to analyze an interaction and visibility of the participants by topic.

6. The computer-implemented method of claim 1, further comprising:
    determining, by one or more computer processors, whether any chat thread of the one or more chat threads has ended; and
    responsive to determining that the any chat thread of the one or more chat threads has ended, providing, by one or more computer processors, a thread summary report for the any chat thread of the one or more chat threads has ended.

7. The computer-implemented method of claim 1, wherein determining whether the new author has entered any chat thread of the one or more chat threads further comprises determining, by one or more computer processors, that the new author previously participated in a current thread, and a length of time since the new author last posted exceeds a default threshold.

8. A computer-implemented method for embodying an expert system into a chat bot, the computer-implemented method comprising the steps of:
    monitoring, by one or more computer processors, one or more chat threads to create a prior chat discourse, wherein the prior chat discourse contains one or more chat data, an author posting frequency of the participants in the chat thread of the one or more chat threads, and an author role of the participants in the chat thread of the one or more chat threads;
    analyzing, by one or more computer processors, the prior chat discourse using topic modeling techniques to create a corpus of linguistic analysis, wherein the corpus of linguistic analysis includes one or more terms of a chat thread of the one or more chat threads and a log-likelihood of the terms of the chat thread of the one or more chat threads;
    creating, by one or more computer processors, a social graph of participants in the one or more chat threads based on the prior chat discourse;

analyzing, by one or more computer processors, the social graph of the participants in the one or more chat threads to create an author analysis database;

determining, by one or more computer processors, whether a new message was posted to a chat thread of the one or more chat threads;

determining, by one or more computer processors, whether the new message posted to the chat thread of the one or more chat threads is related to prior posts by a particular participant in the chat thread of the one or more chat threads based on the corpus of linguistic analysis and the author analysis database;

responsive to determining that the new message posted to the chat thread of the one or more chat threads is related to prior posts by a particular participant in the chat thread of the one or more chat threads, determining, by one or more computer processors, whether the particular participant in the chat thread of the one or more chat threads is still available in the chat thread of the one or more chat threads based on the prior chat discourse;

responsive to determining that the particular participant in the chat thread of the one or more chat threads is not still available in the chat thread of the one or more chat threads, modifying, by one or more computer processors, the chat thread of the one or more chat threads to create a modified chat thread, wherein the modified chat thread includes scaffolding chat, wherein the scaffolding chat uses an expert system based on the corpus of linguistic analysis and the author analysis database; and embodying, by one or more computer processors, the expert system of the particular participant in the chat thread of the one or more chat threads into a chat bot to propagate scaffolding chat in the chat thread of the one or more chat threads.

9. The computer-implemented method of claim 8, wherein the topic modeling techniques to create the corpus of linguistic analysis further comprises using, by one or more computer processors, a Latent Dirichlet Allocation model to analyze an interaction and visibility of the participants by topic.

10. The computer-implemented method of claim 8, wherein the topic modeling techniques to create the corpus of linguistic analysis further comprises using, by one or more computer processors, a BiTerm Model to analyze an interaction and visibility of the participants by topic.

11. The computer-implemented method of claim 8, wherein analyzing the social graph of the participants in the one or more chat threads to create the author analysis database further comprises using, by one or more computer processors, cosine similarity to calculate a similarity score of the participants in the chat thread of the one or more chat threads.

12. The computer-implemented method of claim 8, wherein determining whether the particular participant in the chat thread is still available in the chat thread of the one or more chat threads further comprises:

waiting, by one or more computer processors, a predetermined length of time after the new message is posted to the chat thread; and responsive to determining that the particular participant in the chat thread has not responded to the new message posted to the chat thread, determining, by one or more computer processors, that the particular participant in the chat thread is not available.

13. The computer-implemented method of claim 8, further comprising:

determining, by one or more computer processors, whether the particular participant in the chat thread has returned to the chat thread; and responsive to determining that the particular participant in the chat thread has returned to the chat thread, providing, by one or more computer processors, a bot summary report for the chat thread.

14. A computer system for determining simulation engagement points for chat threads, the computer system comprising:

one or more computer processors;

one or more computer readable storage media; and program instructions stored on the one or more computer readable storage media for execution by at least one of the one or more computer processors, the stored program instructions comprising:

program instructions to monitor one or more chat threads to create a prior chat discourse, wherein the prior chat discourse contains one or more chat data, an author posting frequency of the participants in the chat thread of the one or more chat threads, and an author role of the participants in the chat thread of the one or more chat threads;

program instructions to determine whether a new author has entered any chat thread of the one or more chat threads based on the prior chat discourse;

responsive to determining that the new author has entered any chat thread of the one or more chat threads, program instructions to analyze the prior chat discourse using topic modeling techniques to create a corpus of linguistic analysis, wherein the corpus of linguistic analysis includes one or more terms of the chat thread of the one or more chat threads and a log-likelihood of the terms of the chat thread of the one or more chat threads;

program instructions to create a social graph of participants in the chat thread of the one or more chat threads based on the prior chat discourse;

program instructions to analyze the social graph of the participants in the chat thread of the one or more chat threads using cosine similarity to create an author analysis database, wherein the author analysis database contains a similarity scores between the participants in the chat thread of the one or more chat threads;

program instructions to analyze the author posting frequency of the participants in the chat thread of the one or more chat threads to create a collection class of the author posting frequency, wherein the collection class of the author posting frequency contains a derived results of the posting frequency of the participants in the chat thread of the one or more chat threads;

program instructions to combine the corpus of linguistic analysis and the author analysis database to create a discourse injection point model of participants in the chat thread of the one or more chat threads;

program instructions to establish an optimal in time injection point, wherein the optimal in time injection point is determined from a confluence of the corpus of linguistic analysis, the author analysis database, and the collection class of the author posting frequency; and program instructions to inject the new author into the any chat thread of the one or more chat threads at the optimal in time injection point.

15. The computer system of claim 14, wherein injecting the new author into the any chat thread of the one or more chat threads at the optimal in time injection point further comprises program instructions to use the discourse injection point model to provide a visual overlay.

16. The computer system of claim 15, wherein providing the visual overlay further comprises program instructions to display the visual overlay as a thermograph visual representation.

17. The computer system of claim 14, wherein the topic modeling techniques to create the corpus of linguistic analysis further comprises program instructions to use a Latent Dirichlet Allocation model to analyze an interaction and visibility of the participants in the chat thread of the one or more chat threads by topic.

18. The computer system of claim 14, wherein the topic modeling techniques to create the corpus of linguistic analysis further comprises program instructions to use a BiTerm Model to analyze an interaction and visibility of the participants by topic.

19. The computer system of claim 14, further comprising:
- program instructions to determine whether any chat thread of the one or more chat threads has ended; and
- responsive to determining that the any chat thread of the one or more chat threads has ended, program instructions to provide a thread summary report for the any chat thread of the one or more chat threads that has ended.

20. The computer system of claim 14, wherein determining whether the new author has entered any chat thread of the one or more chat threads further comprises program instructions to determine that the new author previously participated in a current thread, and a length of time since the new author last posted exceeds a default threshold.

* * * * *